United States Patent [19]

Thybault

[11] 3,750,327
[45] Aug. 7, 1973

[54] FLY CATCHING ATTACHMENT FOR VACUUM CLEANER

[75] Inventor: Neil H. Thybault, Highland, Mich.
[73] Assignee: Chris Nicholas, Clarkston, Mich.
[22] Filed: Mar. 13, 1972
[21] Appl. No.: 233,916

[52] U.S. Cl. ............................................. 43/139
[51] Int. Cl. ........................................... A01m 1/06
[58] Field of Search ............................. 43/139, 140

[56] References Cited
UNITED STATES PATENTS
959,155   5/1910   Nault .................................. 43/139
1,006,271   10/1911   Powers ................................ 43/139

Primary Examiner—Warner H. Camp
Attorney—Donnelly, Mentag & Harrington

[57] ABSTRACT

A fly and other insect catching attachment for use with a vacuum cleaner, and which includes a funnel shaped body which is open at the front end thereof and closed at the rear end thereof. A suction conduit is extended through the rear end wall of the funnel shaped body for a distance inward of one-third of the length of the funnel shaped body. The suction conduit is provided with at least one outlet on which is operatively attached a tubular handle that is connected to a vacuum cleaner to produce an intake of air through the front open end of said funnel shaped body to draw insects into said funnel shaped body and thence through said suction conduit and handle and into said vacuum cleaner.

5 Claims, 6 Drawing Figures

PATENTED AUG 7 1973
3,750,327
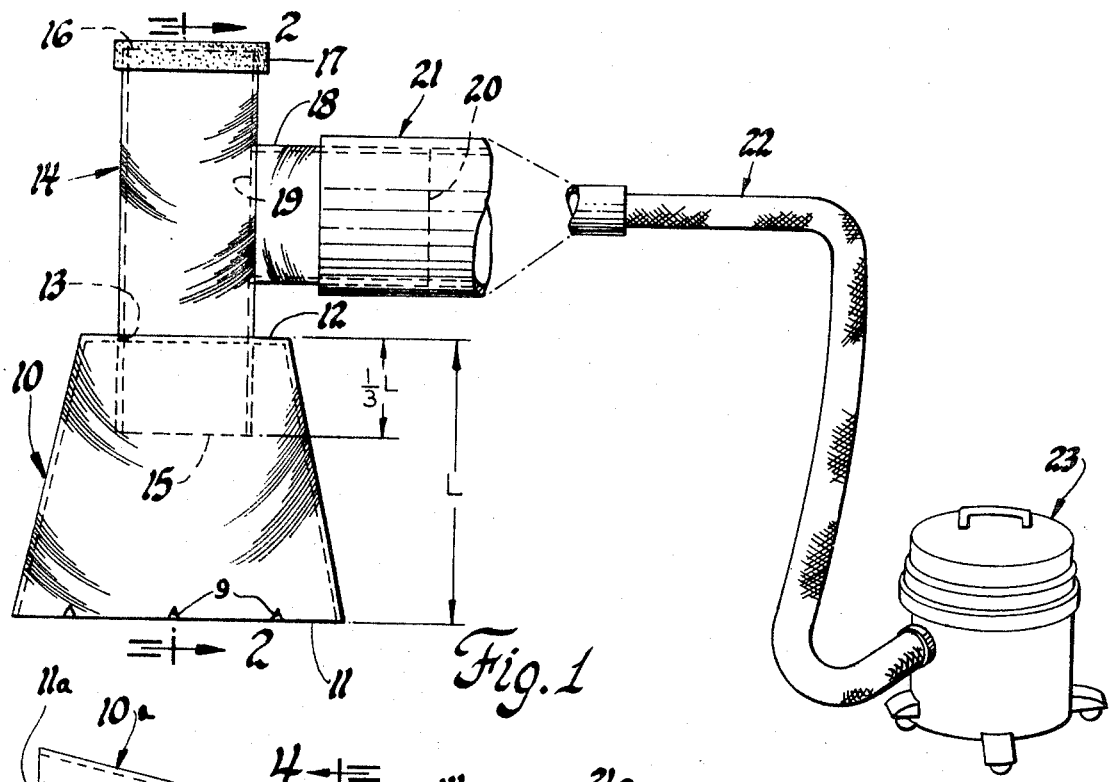
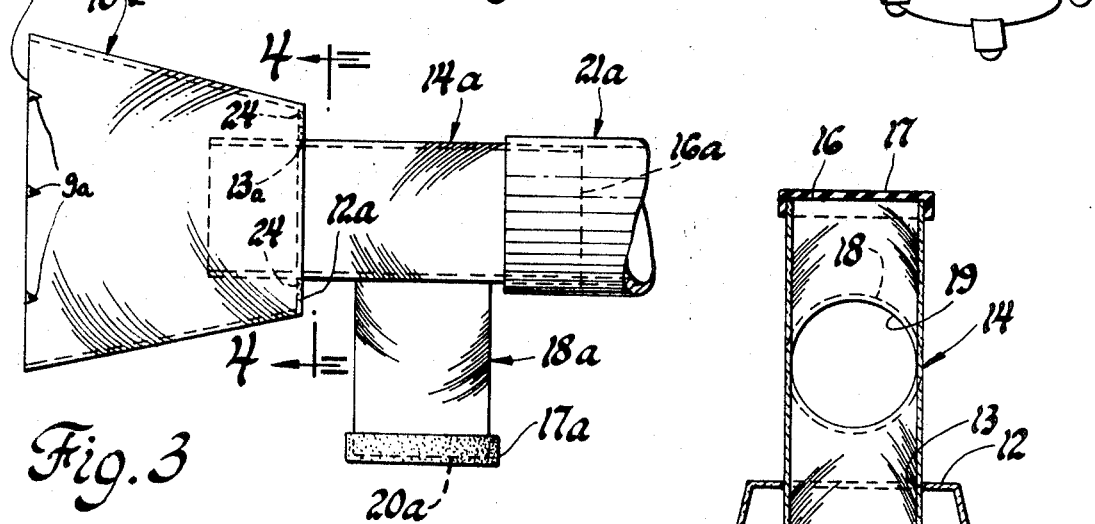
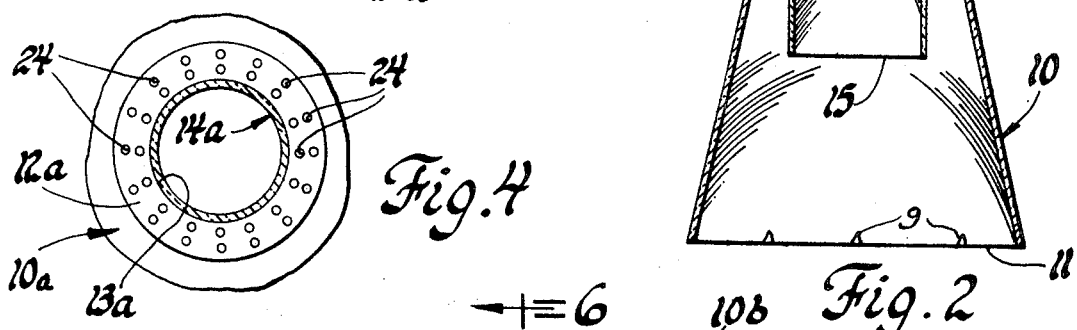
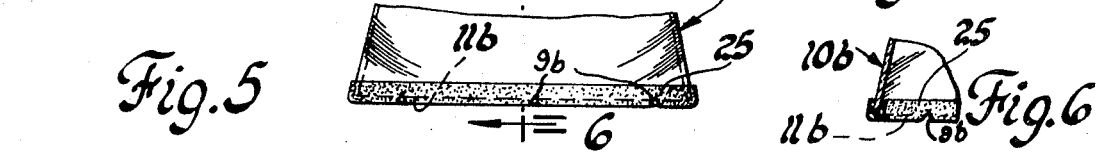

FLY CATCHING ATTACHMENT FOR VACUUM CLEANER

SUMMARY OF THE INVENTION

This invention relates to the insect control art, and more particularly, to an apparatus for catching flies and other insects.

Devices for catching insects by suction means have been provided heretofore. However, the prior art devices of this type have not been satisfactory for various reasons. One disadvantage of said prior art devices is that they are bulky and relatively heavy, making their use as a portable device impractical. Furthermore, in said devices a means is employed for enticing the insects, such as a light, to bring them within the operating range of such devices.

It is an object of the present invention to provide an insect catching attachment for use with a vacuum cleaner which overcomes the aforementioned disadvantages of the prior art devices.

It is another object of the present invention to provide a novel and improved insect catching attachment for use with a vacuum cleaner which is simple and compact in construction, economical to manufacture and efficient in operation.

It is a further object of the present invention to provide a novel and improved insect catching attachment for use with a vacuum cleaner which may be used around food so as to eliminate the need for killing flies and other insects in such areas, and also to eliminate insect sprays and their bad effects in areas where food is being served.

It is still another object of the present invention to provide an insect catching attachment for use with a vacuum cleaner, and which includes a funnel shaped body which is open at the front end thereof and closed at the rear end thereof. A suction conduit is extended through the rear end wall of the funnel shaped body for a distance inward of one-third of the length of the funnel shaped body. The suction conduit is provided with at least one outlet on which is operatively attached a tubular handle that is connected to a vacuum cleaner to produce an intake of air through the front open end of said funnel shaped body to draw insects into said funnel shaped body and thence through said suction conduit and handle and into said vacuum cleaner.

Other objects, features and advantages of this invention will be apparent from the following detailed description, appended claims, and the accompanying drawing.

BRIEF DESCRIPTION OF THE DRAWING

FIG. 1 is a side elevational view of a fly catching attachment for a vacuum cleaner made in accordance with the principles of the present invention.

FIG. 2 is an elevational section view of the structure illustrated in FIG. 1, taken along the line 2—2 thereof, and looking in the direction of the arrows.

FIG. 3 is a side elevational view of a second embodiment of the invention, and showing the fly catching attachment turned clockwise 90° from the position of the first embodiment in FIG. 1.

FIG. 4 is an elevational section view of the structure illustrated in FIG. 3, taken along the line 4—4 thereof, and looking in the direction of the arrows.

FIG. 5 is a fragmentary elevational view of the lower end of a third embodiment of the invention.

FIG. 6 is a fragmentary elevational section view of the structure illustrated in FIG. 5, taken along the line 6—6 thereof, and looking in the direction of the arrows.

BRIEF DESCRIPTION OF THE PREFERRED EMBODIMENTS

Referring now to the drawing, and in particular to FIGS. 1 and 2, the numeral 10 generally designates a funnel shaped body which has a flared tubular side wall that diverges toward a large open end 11. The rear end of the funnel shaped body is enclosed by a rear end wall 12. The funnel shaped body 10 is made from a transparent, colorless plastic so that flies and other insects will have difficulty seeing the funnel shaped body when it is moved over them for a catching operation. A plurality of slits 9 are formed through the side wall of the funnel shaped body 10 around the open end 11 to prevent the funnel shaped body 10 from gripping a table surface or the like by a suction action when the funnel shaped body 10 is placed over an insect, and to permit easy release of said body 10 from the table surface or the like.

As shown in FIGS. 1 and 2, the funnel shaped body rear end wall 12 is provided with an opening 13 through which is extended the front or inner end 15 of a suction conduit 14. The conduit 14 is sealed in the opening 13. The suction conduit 14 is open at the front end 15, and it is also made from the same material from which the funnel shaped body 10 is made. The front end 15 of the suction conduit 14 is extended inwardly, as shown in FIG. 1, for a distance of one-third of the axial length of the funnel shaped body 10. In FIG. 1 the axial length of the funnel shaped body 10 is indicated by the capital letter "L," and the one-third distance extension inwardly of the front end of the conduit 14 is indicated by the symbol "⅓ L."

As shown in FIGS. 1 and 2, an opening 19 is formed in the side wall of the suction conduit 14, and in it is fixedly seated and sealed the inner end of a first outlet conduit 18 which is made from the same material as the conduit 14 and the funnel shaped body 10. The outer end of the outlet tube 18 is indicated by the numeral 20.

The outer end of the suction conduit 14 is indicated by the numeral 16 in FIGS. 1 and 2. As shown in FIGS. 1 and 2, the suction conduit outer end 16 is enclosed by a detachable cap 17 which is slidably mounted on the conduit 14 in a friction slip fit fashion. The cap 17 is preferably made from the same type of transparent plastic material as that used for making the conduits 14 and 18 and the funnel shaped body 10.

As shown in FIG. 1, a tubular handle 21 is slidably mounted over the outer end of the suction conduit 18 by any suitable means, as by a friction slip fit. The handle 21 may be of any suitable length, as for example, approximately three feet, and it is preferably made from the same material as that used in making the conduits 14 and 18, and the funnel shaped body 10. The outer end of the handle 21 is shown in FIG. 1 as being connected, as by a friction slip fit, to the inlet end of the flexible conduit 22 of a conventional tank type vacuum cleaner 23. It will be understood that the handle 21 is connected to the conduit 18 for insect catching operations on a horizontal plane, and that the cap 17 could be placed on the outer end 20 of the tube 18, and the handle 21 placed on the upper end 16 of the conduit 14 when the insect catching attachment is to be used for catching insects, as flies, on the ceiling of a room or on a vertical building wall. The conduits 14 and 18 are of the same cross sectional size so as to permit the use of the cap 17 on either of these conduits.

The insect catching attachment of the present invention may be used for catching insects, as flies, when they are resting on horizontal or vertically disposed surfaces. For example, the handle 21 may be mounted on the conduit 18 as shown in FIG. 1; and with the vacuum cleaner operating, it may be used for catching flies around a table on which food is being served without the need for killing flies and other insects around the food. The insect catching attachment of the present invention also eliminates the need for using insect sprays and their bad effects around a kitchen and other places where food is being served. It has been found that such insect sprays have injurious effects on infants and pets, and accordingly, the insect catching attachment of the present invention eliminates the need for using such insect sprays.

The handle 21 may be quickly and easily interchanged with the cap 17, whereby the handle 21 may be mounted on the outer end 16 of the conduit 14 for use on vertical surfaces, ceilings and the like.

FIGS. 3 and 4 illustrate a second embodiment of the invention, and the parts of this embodiment which are the same as the parts of the first embodiment of FIGS. 1 and 2 have been marked with the same reference numerals followed by the small letter "a." The handle 21a is shown in FIG. 3 as being mounted on the outer end 16a of the suction conduit 14a.

The only structural difference between the second embodiment of FIGS. 3 and 4 and the first embodiment of FIGS. 1 and 2 is that the funnel shaped body rear end wall 12a is provided with a plurality of small openings or air vent ports 24. The embodiment of FIGS. 3 and 4 is used in the same manner as the embodiment of FIGS. 1 and 2.

FIGS. 5 and 6 illustrate a slight modification of the invention, and the parts thereof which are the same as the parts of the first embdiment of FIGS. 1 and 2 have been marked with the same reference numerals followed by the small letter "b." As shown in FIGS. 5 and 6, the funnel shaped body 10b is provided around the front end thereof with a U-shaped cushion means 25 made from a suitable transparent, colorless plastic, but which is flexible and resilient as compared to the plastic material from which the funnel shaped body 10b is made. The structure illustrated in FIGS. 5 and 6 functions in the same manner as the previously described embodiments.

While it will be apparent that the preferred embodiments of the invention herein disclosed are well calculated to fulfill the objects above stated, it will be appreciated that the invention is susceptible to modification, variation and change.

What is claimed is:

1. A fly catching attachment for use with a vacuum cleaner, comprising:
    a. a funnel shaped body which is open at the large front end thereof and closed at the small rear end thereof by a rear end wall;
    b. a suction conduit having its inner end extended through an opening in said funnel rear end wall and secured to said rear end wall, and with said inner end extended into said funnel shaped body for a distance of one-third of the length of said funnel shaped body;
    c. said suction conduit being provided with at least one outlet;
    d. a tubular handle operatively attached to said outlet and being adapted for attachment to a vacuum cleaner to produce an intake of air through the front open end of said funnel shaped body to draw insects into said funnel shaped body and thence through said suction conduit and handle and into said vacuum cleaner.

2. A fly catching attachment for use with a vacuum cleaner, as defined in claim 1, wherein:
    a. said suction conduit is provided with at least a pair of outlets with said tubular handle being operatively attached to one of said pair of outlets and the other of said pair of outlets being enclosed by a cap.

3. A fly catching attachment as defined in claim 1, wherein:
    a. the rear end wall of said funnel shaped body is provided with a plurality of vent ports.

4. A fly catching attachment as defined in claim 1, wherein:
    a. said funnel shaped body is provided around the front opening thereof with a plurality of slits to communicate the interior of the funnel shaped body with the atmosphere.

5. A fly catching attachment as defined in claim 1, wherein:
    a. a cushion means is mounted on the front end of said funnel shaped body.

* * * * *